United States Patent
Endres et al.

(10) Patent No.: US 11,368,022 B2
(45) Date of Patent: Jun. 21, 2022

(54) DEVICE AND METHOD FOR CONTROLLING A LOAD FLOW IN AN ALTERNATING-VOLTAGE NETWORK

(71) Applicant: Siemens Energy Global GmbH & Co. KG, Munich (DE)

(72) Inventors: Burkard Endres, Rosstal (DE); Martin Pieschel, Altdorf (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 16/975,070

(22) PCT Filed: Feb. 28, 2018

(86) PCT No.: PCT/EP2018/054921
§ 371 (c)(1),
(2) Date: Aug. 21, 2020

(87) PCT Pub. No.: WO2019/166082
PCT Pub. Date: Sep. 6, 2019

(65) Prior Publication Data
US 2020/0403407 A1 Dec. 24, 2020

(51) Int. Cl.
*H02B 1/24* (2006.01)
*H02J 3/18* (2006.01)
*H02H 7/22* (2006.01)

(52) U.S. Cl.
CPC .............. *H02J 3/1807* (2013.01); *H02H 7/22* (2013.01)

(58) Field of Classification Search
CPC ................................ H02J 3/1807; H02H 7/22
(Continued)

(56) References Cited

U.S. PATENT DOCUMENTS

| 5,942,880 A | 8/1999 | Akamatsu et al. |
| 6,130,524 A | 10/2000 | Stemmler |

(Continued)

FOREIGN PATENT DOCUMENTS

| DE | 10103031 B4 | 12/2011 |
| WO | WO2013087110 A1 | 6/2013 |
| WO | WO2017001963 A1 | 6/2017 |

OTHER PUBLICATIONS

Hao Xinjie et al:"Study on fundamental impedance characteristics and control strategy for TCSC with dual-TCR branches", 2015 IEEE International Conference on Information and Automation, IEEE, pp. 2367-2372, XP033222770, DOI: 10.1109/ICINFA.2015. 7279682, [gefunden am Sep. 28, 2015], the whole document; 2015.

*Primary Examiner* — Rexford N Barnie
*Assistant Examiner* — Dru Parries
(74) *Attorney, Agent, or Firm* — Laurence A. Greenberg; Werner H. Stemer; Ralph E. Locher

(57) ABSTRACT

A device for controlling a load flow in an alternating-voltage network includes first and second modular series connections of double-pole switching modules interconnected in a parallel circuit to be inserted in series into a phase line of the alternating-voltage network. At least one switching module of each connection has an energy store and semiconductor switches to be switched on and off. The semiconductor switches can be controlled in such a way that a switching module voltage can be generated at terminals of the switching module. The switching module voltage corresponds to a positive or negative storage voltage or a zero voltage. A control apparatus for controlling the switching modules is configured to generate an equalizing current between the modular series connections. A method for controlling a load flow by using the device is also provided.

10 Claims, 3 Drawing Sheets

(58) Field of Classification Search
USPC .......................................................... 307/113
See application file for complete search history.

(56) References Cited

U.S. PATENT DOCUMENTS

| | | | |
|---|---|---|---|
| 10,468,884 B2* | 11/2019 | Augsburger | H02J 3/26 |
| 2013/0208521 A1* | 8/2013 | Trainer | H02J 3/36 |
| | | | 363/126 |
| 2014/0133196 A1* | 5/2014 | Trainer | H02J 3/18 |
| | | | 363/35 |
| 2014/0218986 A1 | 8/2014 | Hasler et al. | |
| 2015/0069980 A1 | 3/2015 | Gambach et al. | |

* cited by examiner

DEVICE AND METHOD FOR CONTROLLING A LOAD FLOW IN AN ALTERNATING-VOLTAGE NETWORK

BACKGROUND OF THE INVENTION

Field of the Invention

The invention relates to a device for controlling a load flow in an alternating-voltage network with a first modular series connection of double-pole switching modules.

In an alternating-voltage network, in particular a branched or an intermeshed alternating-current network, it is often necessary to adjust the load flow in such a way that an operating current which flows in the alternating-voltage network is distributed over parallel lines of the alternating-voltage network as uniformly as possible. This is in particular justified by the square dependence of the ohmic losses of current, whereby the efficiency of energy transmission is also significantly influenced. In addition, the reactive power generation and the reactive power consumption must be controlled in alternating-voltage networks. Optimal utilization of existing alternating-voltage networks takes on a significantly increased importance within the framework of increasing energy quantities which are to be transmitted owing to the increased use of renewable energy sources.

In the prior art, devices for controlling the load flow are known in particular as reactive power compensation systems. For example, capacitors which are inserted into an alternating-voltage line of the alternating-voltage network in a serial manner are used in so-called fixed series compensation (FSC).

Furthermore, static reactive power compensators are known which comprise converters which are arranged parallel to the alternating-voltage line. For example, printed document WO 2013/087110 A1 shows a converter with three phase branches which are connected to one another in a delta connection. Each phase branch has a connection point for connecting to a phase line, which is associated therewith, of a three-phase alternating-voltage network. In this case, the phase branches are each connected to the associated phase line of the alternating-voltage network via coupling inductors. Each phase branch has a phase module with a series connection of double-pole switching modules, wherein the switching modules are designed as so-called full bridge module circuits. Each switching module consequently comprises two series connections of semiconductor switch units which are connected in parallel to one another, wherein each semiconductor switch unit comprises a semiconductor switch which can be switched on and off as well as a free-wheeling diode which is antiparallel thereto. Furthermore, each switching module has an energy store, connected in parallel to the two series connections, in the form of a capacitor. Each switching module can be controlled in such a way that a voltage drop occurs at the poles thereof, which voltage either corresponds to an energy storage voltage, i.e. the voltage of the capacitor, the energy storage voltage but with reverse polarity, or a zero voltage, i.e. a voltage with the value of zero. A stepped alternating voltage can thus be generated at the phase modules of the converter by means of suitable control of the switching modules. In this case, the individual step height corresponds to the energy storage voltage. Furthermore, the known converter comprises a control device for controlling the currents in the phase branches of the converter, so that a desired inductive reactive power can be provided in the alternating-voltage network.

An appropriate device is known from WO 2017/101963 A1. The known device comprises in each case a modular series connection in each phase line of the alternating-voltage network. The switching modules of the modular series connections can be controlled in such a way that a periodic longitudinal voltage can be generated in the alternating-voltage network. A relatively fast and substantially continuously adjustable longitudinal voltage can be generated in the alternating-voltage network by means of the known device. In comparison to a parallel compensation, only relatively small voltages must be fed into the alternating-voltage network in a serial manner in order to effectively influence the load flow. In this case, a longitudinal voltage is understood to mean a voltage which is applied along a current line or along a section of a current line, for example between two connections of the modular series connection. In this case, the modular series connection is designed with two poles, so that the entire phase current which flows in the phase line also flows through the respective modular series connection. A longitudinal voltage of a predetermined frequency and phase can be generated by means of the known device. In this case, the energy from the alternating-voltage network is temporarily stored in the energy stores of the switching modules. In this way, the device can initially feed reactive power into the alternating-voltage network, wherein a short-term active power feed-in is also possible. In order to generate the periodic longitudinal voltage, a control device controls the switching modules or the power semiconductor of the switching modules in such a way that a polarity of the switching module voltage changes in a predetermined chronological order, for example. Since all semiconductor switches of all switching modules can, in principle, be switched independently of one another, a longitudinal voltage of a desired phase and frequency can therefore be generated. The longitudinal voltage which should be applied to effectively influence the load flow is relatively low compared to a transverse voltage which must be fed in by means of systems which are connected in parallel. For example, longitudinal voltages from 1 kV to 50 kV can already be sufficient at a transmission voltage of over 100 kV in the alternating-voltage network. However, an active power feed-in over a longer period of time can only be achieved by means of the known device if an energy transmission between the modular series connections is made possible in different phase lines. In this way, the known device comprises an energy exchange device for exchanging electrical energy between the modular series connections. However, the known energy exchange device is relatively complex and expensive. In addition, the power flow in the alternating-voltage network must be interrupted each time the device is switched on, since the entire current flows through the respective modular series connection.

A further device for load flow control is known from the article "Transformer-Less Unified Power-Flow Controller Using the Cascade Multilevel Inverter" by Fang Zheng Peng et al. In this case, a static compensator (STATCOM) which is connected in parallel is combined with a static synchronous series compensator (SSSC). If the switching modules of the SSSC are not powered by a separate energy source, the energy storage voltages of the individual switching modules can only be balanced, i.e. kept within their permissible operating range, if there is a line current flowing. In addition, switching on is also problematic in this known solution, since in such an event the startup time of the electronics causes an interruption in the load flow.

SUMMARY OF THE INVENTION

The object of the invention is to propose an appropriate device which is as cost-effective and reliable as possible.

The object is achieved according to the invention with an appropriate device by the device further comprising a second modular series connection of double-pole switching modules, wherein the two modular series connections are connected to one another in a parallel circuit which can be inserted into a phase line of the alternating-voltage network in a serial manner, wherein at least one switching module of each modular series connection has an energy store as well as semiconductor switches which can be switched on and off and which can be controlled in such a way that a switching module voltage can be generated at terminals of the switching module, which switching module voltage corresponds to a positive or negative energy storage voltage or to a zero voltage, and wherein the device further comprises a control device for controlling the switching modules, which control device is set up to generate an equalizing current between the modular series connections. Consequently, the device comprises at least two modular series connections which are connected in parallel to one another and the parallel circuit can be connected in series in a phase line as a longitudinal voltage source. The number of switching modules in the modular series connections can be determined depending on the nominal current thereof and the nominal current of the alternating-voltage network. According to the structure of the modular series connections, this can generally be selected as desired and can be adapted to the respective application.

The parallel circuit of the modular series connections makes it possible to advantageously operate the equalizing current between the switching modules of the two modular series connections. The equalizing current flows in the mesh formed by the modular series connections and in particular not into the remaining alternating-voltage network, and therefore does not affect it. The equalizing current advantageously enables a balancing of the switching modules or the energy store thereof, even if there is no current flowing in the connected alternating-voltage network. Reliable load flow control in the alternating-voltage network is therefore possible in a cost-effective manner. A further advantage of the device according to the invention is that an expensive series transformer can be dispensed with.

According to an embodiment of the invention, the device further comprises a controllable protection device by means of which the modular series connections can be bypassed. When the device is starting up, the protection device advantageously causes the switching modules to temporarily switch on until they are ready for operation and also advantageously protects the device in the event of a network short circuit.

The protection device preferably comprises a double thyristor switch. A controllable, bidirectional bypassing is provided in a simple manner with this configuration. In this case, the double thyristor switch advantageously comprises thyristors which are connected in anti-parallel. The thyristors can be controlled by means of a control system, for conducting.

The protection device further preferably comprises a power choke. The power choke advantageously limits the power surge when switching on the device.

The device suitably further comprises a mechanical bypass switch which is set up to bypass the parallel circuit of the modular series connections. A relatively low impedance bypass path can be provided by means of the bypass switch if the device is to be temporarily disconnected from the network.

Furthermore, the device preferably further comprises a series compensator switch which is arranged in a series connection to the parallel circuit of the modular series connections. The series compensator switch is set up to interrupt the current through the modular series connections. This can be advantageous, for example, if the protection device bypasses the modular series connections.

According to a preferred embodiment of the invention, the device comprises a parallel circuit of modular series connections for each phase line of the alternating-voltage network. In the case of a three-phase alternating-voltage network, the device consequently comprises three parallel circuits of at least two modular series connections in each case. One of the parallel circuits can be inserted into each of the phase lines. In this case, all modular series connections can, but do not have to, be structured in the same manner. The device is therefore set up to control the load flow in the multiphase alternating-voltage network.

It can be advantageous if the switching modules are designed as full bridge module circuits. A full bridge module circuit is described in WO 2013/087110 A1, for example.

It is also possible to design the switching modules as two oppositely directed half bridge module circuits. A half bridge module circuit is known from DE 10 103 031 B4, for example.

However, it is also conceivable, of course, if the first or each modular series connection has further double-pole elements which are connected together with the submodules in the phase line or the discharge line to form a series connection.

According to an embodiment of the invention, the control device is set up to generate the equalizing current which is a direct current or an alternating current with a current frequency which corresponds to a multiple of a line frequency of the alternating-voltage network.

The invention further relates to a method for controlling a load flow in an alternating-voltage network.

The object of the invention involves specifying such a method which is to be carried out in as simple a manner as possible and is reliable.

The object is achieved according to the invention by a method for controlling a load flow in an alternating-voltage network by means of the device according to the invention, in which method an equalizing current is generated between the modular series connections for balancing the energy storage voltages.

The advantages of the method according to the invention correspond to those which have already been explained in relation to the device according to the invention.

The equalizing current is preferably a direct current or an alternating current which has a current frequency which corresponds to a multiple of a line frequency of the alternating-voltage network.

BRIEF DESCRIPTION OF THE SEVERAL VIEWS OF THE DRAWING

The invention is explained in more detail hereinafter using exemplary embodiments from FIGS. 1 to 3.

DETAILED DESCRIPTION OF THE INVENTION

Figure 1:
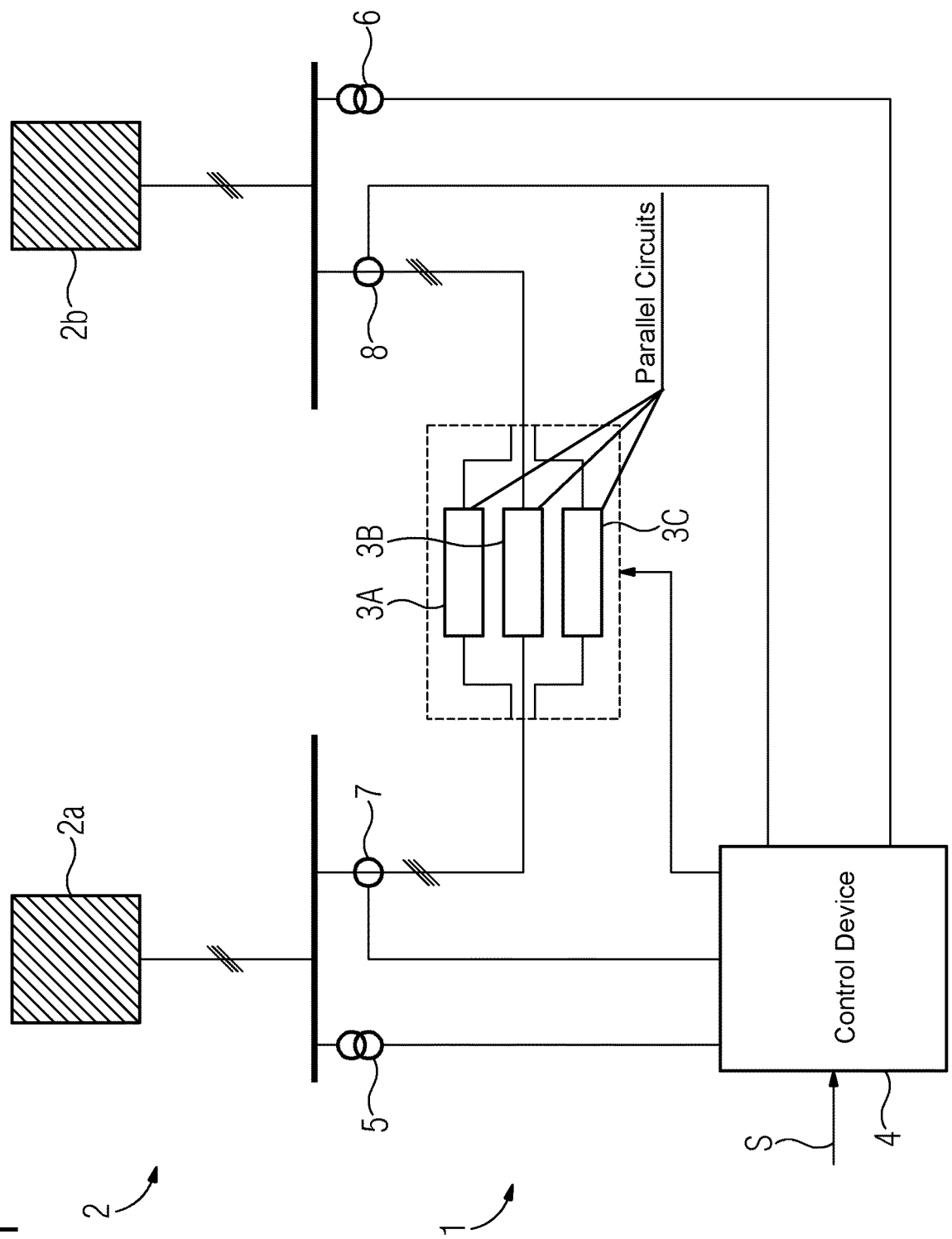
FIG. 1 shows an exemplary embodiment of a device according to the invention in a schematic depiction.

FIG. 1 depicts a device 1 for controlling a load flow in an alternating-voltage network 2. In this case, the alternating-voltage network 2 comprises two subnetworks 2*a* and 2*b* which are connected to one another by means of the device 1. In other words, the device 1 can be inserted into the three-phase alternating-voltage network 2 in a serial manner.

The device 1 comprises three parallel circuits 3A, 3B and 3C which are each associated with a phase line of the three-phase alternating-voltage network 2. The structure of the parallel circuits 3A-C will be mentioned in greater detail in subsequent FIG. 2.

The device 1 further comprises a control device 4 which is set up to control the device 1 and to control all of the switches of the device 1. In this case, the control device 4 receives a set S of target values from a superordinate control unit. The control device 4 is connected to a plurality of voltage measuring devices 5, 6 or current measuring devices 7, 8. The voltage measuring devices and current measuring devices 5-8 measure a voltage or current in the two subnetworks 2*a-b* and transmit the corresponding measurement values to the control device 4 for controlling the device 1. The control device also receives current values and voltage values from switching modules (see FIGS. 2 and 3) which are used for balancing energy stores of the switching modules. In the exemplary embodiment depicted in FIG. 1, the parallel circuits 3A-C are structured in the same manner.

Figure 2:
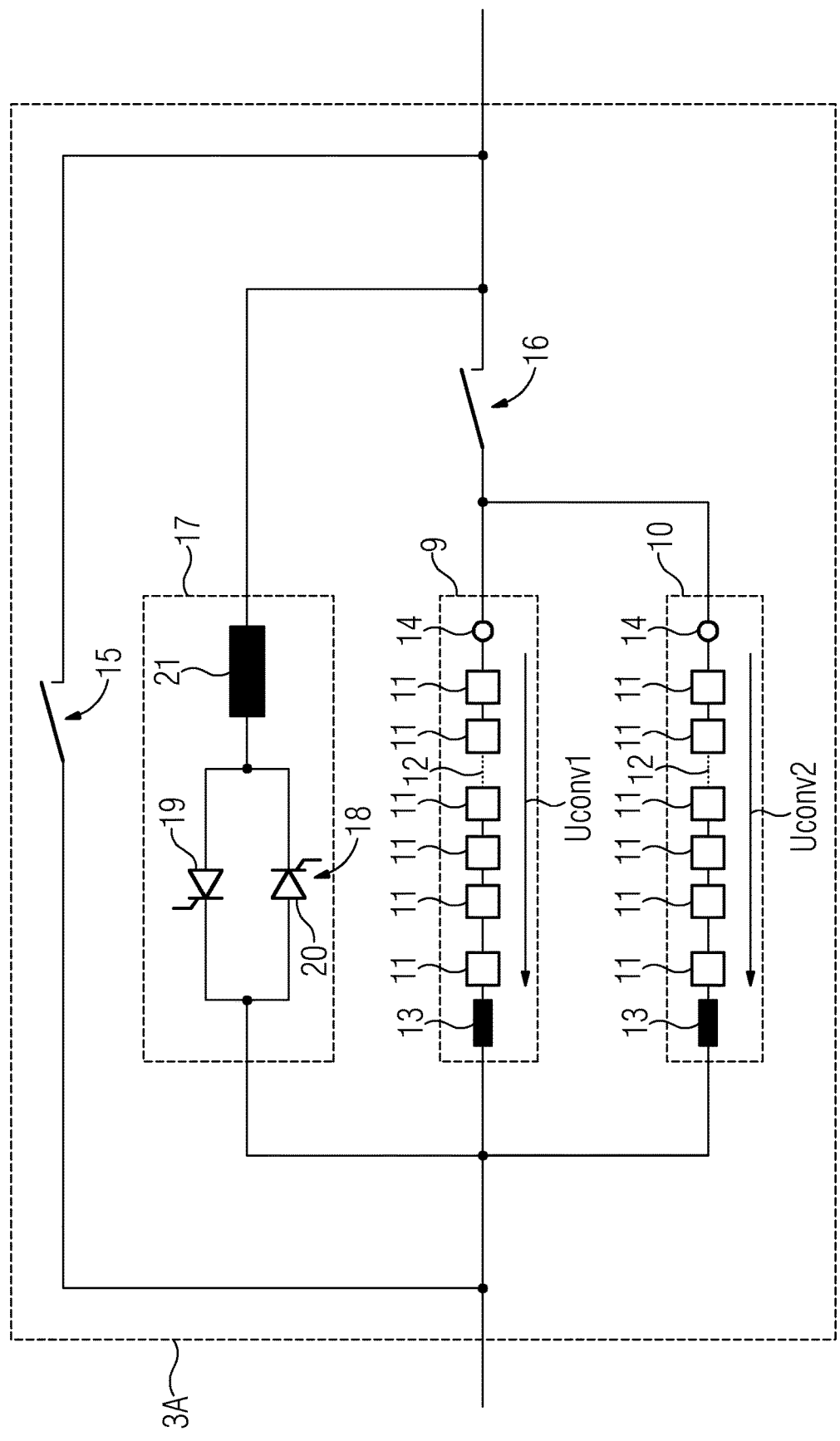
FIG. 2 shows a parallel circuit of modular series connections of the device from FIG. 1 in a schematic depiction.

FIG. 2 shows the parallel circuit 3A of the device 1 from FIG. 1. The parallel circuit 3A comprises a first modular series connection 9 and a second modular series connection 10 which are arranged in parallel to one another. The first modular series connection 9 and the second modular series connection 10 are structured in the same manner in the example depicted. The first modular series connection 9 comprises a series connection of double-pole switching modules 11 which are structured in the same manner in each case in the form of a full bridge module circuit in the example depicted (see FIG. 3). The number of switching modules 11 in each of the modular series connections 9, 10 is, in principle, arbitrary, which is indicated in FIG. 2 by a dotted line 12 in each case. Both modular series connections 9, 10 further comprise a smoothing choke 13 and an ammeter 14 for measuring a module current through the respective modular series connection 9 or 10. The structure of the switching modules 11 is mentioned in greater detail in subsequent FIG. 3. A longitudinal voltage Uconv1 can be generated at the first modular series connection 9 by means of the control device 4, which longitudinal voltage has an almost arbitrary form. For example, an alternating voltage can be generated with the line frequency of the alternating-voltage network 2 and a predetermined phase. Correspondingly, a module voltage Uconv2 can also be generated at the second modular series connection which is also almost arbitrary. In addition, an equalizing current can be generated between the modular series connections 9, 10 by suitably controlling the switching modules 11 of the two modular series connections 9, 10. The equalizing current flows as a circulating current in the mesh which is formed by the modular series connections 9 and 10 and therefore does not interfere with the current flow in the alternating-voltage network 2. The equalizing current can be used for charging and discharging the energy store of the switching modules 11. In this way, a balancing of the energy store can be achieved.

In addition, a mechanical bypass switch 15, a mechanical series compensator switch 16 as well as a protection device 17 are provided, the function of which is to be mentioned hereinafter. In this case, the protection device 17 comprises a double thyristor switch 18 which comprises two thyristors 19, 20 which are connected in anti-parallel. A power choke 21 is arranged in series with the double thyristor switch 18.

The start-up of the device 1 can be described as follows: the thyristors 19, 20 of the double thyristor switch 18 are triggered. The series compensator switch 16 is closed. The bypass switch 15 is opened. Thereafter, for each period of the line voltage, the double thyristor switch is momentarily triggered until the switching modules 11 transmit a ready-for-operation signal to the control device 4. Thereafter, the switching modules 11 are actively controlled in normal operation, wherein the thyristors 19, 20 block.

Figure 3:
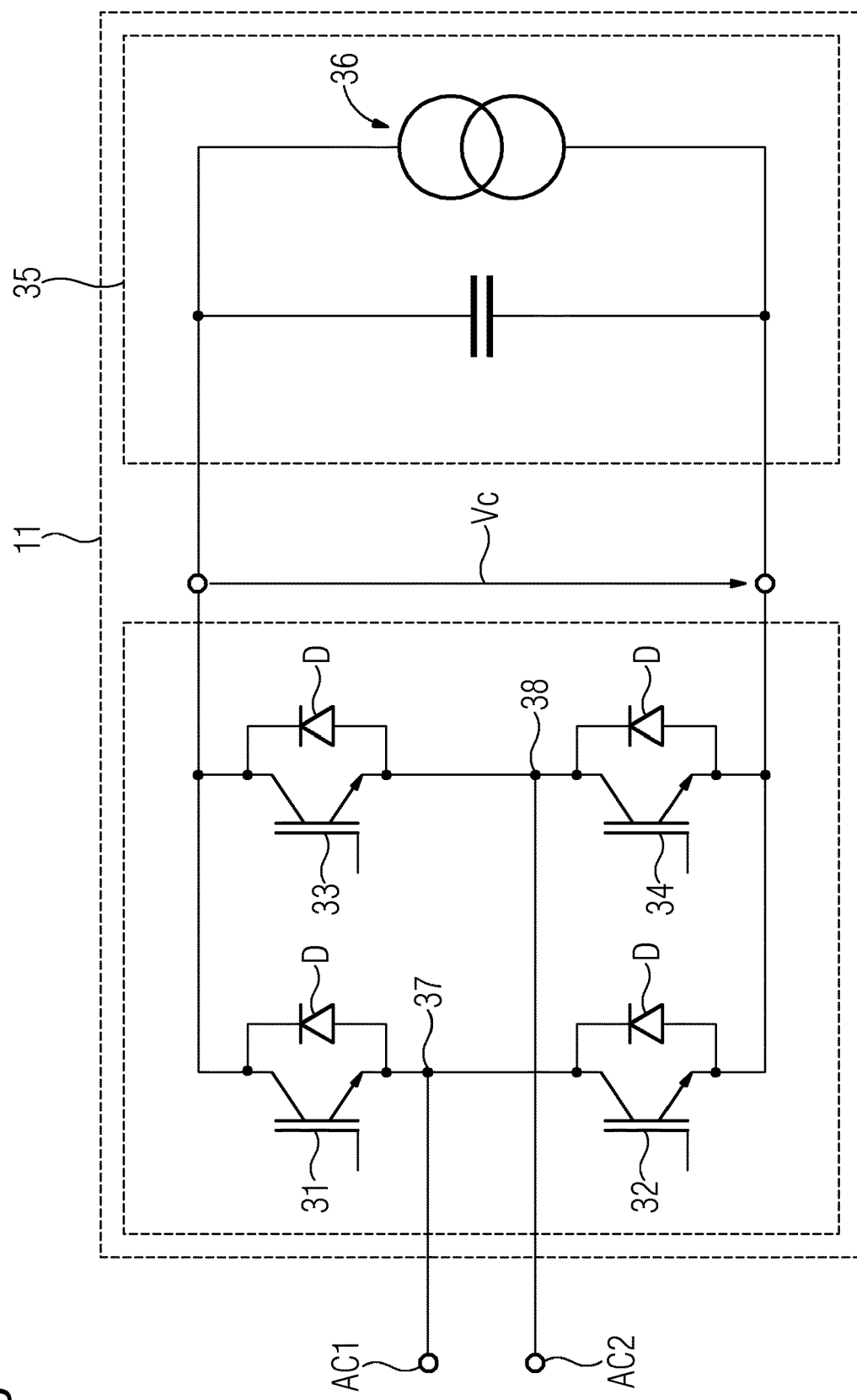
FIG. 3 shows a switching module for the device from FIGS. 1 and 2 in a schematic depiction.

FIG. 3 shows the structure of one of the switching modules 11 of the device 1 according to the invention from FIGS. 1 and 2. All of the switching modules 11 from FIG. 2 are designed in the same manner for this purpose, but this does not generally have to be the case. The switching module 11 is designed as a full bridge module circuit. In this case, the switching module 11 has a first semiconductor switch 31 as well as a second semiconductor switch 32, both in the form of IGBTs. The forward direction of the two semiconductor switches 31 and 32 is the same. Furthermore, the switching module 11 comprises a third semiconductor switch 33 as well as a fourth semiconductor switch 34, both also in the form of IGBTs. The IGBTs can be replaced by other semiconductor switches which can be disconnected, such as IGCTs, IEGTs, MOSFETs or the like, for example. The forward direction of the two semiconductor switches 33 and 34 is the same. An energy store in the form of a switching module capacitor 35 is arranged in parallel to the two series connections of the semiconductor switches 31-34. A voltmeter 36 is associated with the switching module capacitor 35, by means of which voltmeter the energy storage voltage Vc can be monitored. A first connection AC1 is arranged at a potential point 37 between the semiconductor switches 31, 32, a second connection AC2 is arranged at a potential point 38 between the semiconductor switches 33, 34. In each case, a free-wheeling diode D is connected in antiparallel to each of the semiconductor switches 31-34. By suitably controlling the power semiconductors 31-34, the voltage which drops at the connections AC1, 2 can be generated which corresponds to the voltage Vc which drops at the switching module capacitor 35, the voltage which drops at the switching module capacitor 35 but with reverse polarity (−Vc) or the zero voltage. In addition, energy can be supplied to or extracted from the switching module capacitor 35 by correspondingly controlling the individual semiconductor switches 31-34.

The invention claimed is:

1. A device for controlling a load flow in an alternating-voltage network, the device comprising:
   a first modular series connection of double-pole switching modules;
   a second modular series connection of double-pole switching modules;
   said first and second modular series connections being interconnected in a parallel circuit to be serially inserted into a phase line of the alternating-voltage network;
   at least one of said switching modules of each of said modular series connections having terminals, an energy store and semiconductor switches being switchable on and off and controllable for generating a switching module voltage at said terminals of said switching module, the switching module voltage corresponding to a positive or negative energy storage voltage or to a zero voltage; and a control device for controlling said switching modules, said control device configured to generate a circulating equalizing current between said modular series connections, the circulating equalizing current being an alternating current with a current frequency corresponding to a multiple of a line frequency of the alternating-voltage network.

2. The device according to claim 1, which further comprises a controllable protection device for bypassing said modular series connections.

3. The device according to claim 2, wherein said protection device includes a double thyristor switch.

4. The device according to claim 2, wherein said protection device includes a power choke.

5. The device according to claim 1, which further comprises a mechanical bypass switch configured to bypass said parallel circuit of said modular series connections.

6. The device according to claim 1, which further comprises a series compensator switch connected in series with said parallel circuit of said modular series connections.

7. The device according to claim 1, wherein said modular series connections include a respective parallel circuit of said series connections for each phase line of the alternating-voltage network.

8. The device according to claim 1, wherein said switching modules are full bridge module circuits.

9. The device according to claim 1, wherein said switching modules each include two respective oppositely directed half bridge module circuits.

10. A method for controlling a load flow in an alternating-voltage network, the method comprising:
providing a device according to claim 1; and
generating an equalizing current between said modular series connections for balancing the energy storage voltages.

* * * * *